United States Patent [19]

Mori et al.

[11] Patent Number: 5,409,520
[45] Date of Patent: Apr. 25, 1995

[54] COPPER POWDER FOR SOLDERABLE AND ELECTROCONDUCTIVE PAINTS AND PROCESS FOR PRODUCING THE SAME

[75] Inventors: Seiji Mori; Kanetaro Sannohe, both of Takehara, Japan

[73] Assignee: Mitsui Kinzoku Kogyo Kabushiki Kaisha, Tokyo, Japan

[21] Appl. No.: 154,492

[22] Filed: Nov. 19, 1993

[30] Foreign Application Priority Data

Nov. 25, 1992 [JP] Japan ................................. 4-338042

[51] Int. Cl.$^6$ ................................. B22F 1/00
[52] U.S. Cl. ................................. 75/255; 420/469
[58] Field of Search ................................. 75/255; 420/469

[56] References Cited

U.S. PATENT DOCUMENTS

| | | | |
|---|---|---|---|
| 3,619,170 | 11/1971 | Fisher et al. | 75/0.5 R |
| 4,082,681 | 4/1978 | Takayama et al. | 252/62.1 P |
| 4,462,845 | 7/1984 | Klar et al. | 148/13.2 |
| 4,663,079 | 5/1987 | Yamaguchi et al. | 252/512 |
| 4,705,647 | 11/1987 | Yamaguchi et al. | 252/512 |
| 4,921,623 | 5/1990 | Yamaguchi et al. | 252/512 |

FOREIGN PATENT DOCUMENTS

| | | |
|---|---|---|
| 62-199705 | 9/1987 | Japan . |
| 39693 | 2/1989 | Japan . |
| 2-182809 | 7/1990 | Japan . |
| 6254 | 3/1991 | Japan . |

OTHER PUBLICATIONS

Taubenblat, P. W., "Copper Base Powder Metallurgy", vol. 7, pp. 29–37.

Taubenblat, P. W., "Copper Base Powder Metallurgy", vol. 7, pp. 11–19, 1980.

*Primary Examiner*—Donald P. Walsh
*Assistant Examiner*—Daniel Jenkins
*Attorney, Agent, or Firm*—Stevens, Davis, Miller & Mosher

[57] ABSTRACT

This invention is to offer a copper powder for solderable and conductive paints which have an improved solderability, excellent adhesion and conductivity.

A copper powder for solderable and conductive paints comprising particles of green caterpillar shape is obtained by crushing particulate dendritic copper powder, and has an oil absorption value (JIS K5101) of up to 20 ml/100 g, a maximum particle diameter of up to 44 μm, an average particle diameter of up to 10 μm, and a hydrogen-reduction loss of up to 0.5%. A process for producing this copper powder for solderable and conductive paints comprises: preparing a copper powder comprising particles of a green caterpillar shape having an average particle diameter of up to 10 μm by crushing dendritic copper powder having a maximum diameter of up to 44 μm by means of a crushing apparatus; treating the copper powders thus obtained with a pickling solution consisting of inorganic acids or organic acids to dissolve and remove any oxidation film on the copper powder surface; washing the copper powder with water; spraying a quick drying organic solvent on the copper powders; and hot-air drying the copper powder, thereby obtaining a copper powder having an oil absorption value of up to 20 ml/100 g and a hydrogen-reduction loss of up to 0.5%.

2 Claims, 1 Drawing Sheet

COPPER POWDER FOR SOLDERABLE AND ELECTROCONDUCTIVE PAINTS AND PROCESS FOR PRODUCING THE SAME

TECHNICAL FIELD

The present invention relates to a novel copper powder for solderable and electroconductive paints and a process for producing the same.

PRIOR ART AND BACKGROUND OF THE INVENTION

Recently, inexpensive copper powder is being used in place of expensive silver powder as a metal powder for electroconductive paints such as a paint for printed wiring of electronic circuits. Such electroconductive paints (hereinafter referred to simply as conductive paints) are generally produced by mixing dendritic copper powder which is obtained through electrodeposition with synthetic resins and organic solvents. At the time of use, such conductive paints are applied on an insulative substrate by a method such as screen printing to form a conductive circuit. Then the coated film of this circuit is heated to harden, after which a flux is applied on the above-mentioned coating film to solder lead wires.

It is necessary that conductive paints or copper powders used in this manner have improved conductivity, good adhesion of coated film and good solderability or wettability relative to the coated film. As these paints or copper powders, various materials have hitherto been proposed but these have not always been fully satisfactory.

For example, according to the disclosure of Japanese Patent Publication No. 39693/1989, it is important that hydrogen reduction loss does not exceed 0.20% in order to improve the conductivity of the coated film. Accordingly, the oxidation film of dendritic electrolytic copper powder is reduced by a drying process such as that in a high-temperature hydrogen stream. However, in this case, this process is accompanied by such numerous problems in practicality that the danger of explosion or complexity of facilities and process is always involved, and the surface state of the copper powder after treatment is very active, whereby the possibility of re-oxidization tending to increase hydrogen-reduction loss is high. The term herein referred to as "hydrogen-reduction loss" means a value obtained by the measuring method specified in the JPMA P03-1992 method. In the case of a copper powder, the weight loss percentage is measured when the powder is reduced in a hydrogen stream at 875° C. for 30 minutes, and the oxidized film which impedes conductivity is measured as a weight loss percentage.

In addition, Japanese Patent Publication No. 6254/1991 discloses an invention concerning a solderable and conductive paints comprising dendritic electrolytic copper powders, resol type phenolic resins, fatty acids or salts thereof and metallic chelating agents. According to this reference, direct soldering on a coated film is possible whereby further improvement of conductivity is possible. In actual practice, however, this invention has a disadvantage in that direct soldering on the surface of coated film is difficult, resulting in complexity of process-shortening in circuit or coated film forming.

We have carried out extensive studies and experiments directed toward providing a copper powder for solderable and conductive paints having improved solderability and excellent adhesion and conductivity and toward a process for producing the same by solving the above described problems. As a result, we have found that oil absorption and hydrogen-reduction loss have an effect on properties such as solderability, adhesion and conductivity and that if oil absorption and hydrogen-reduction loss are kept below specific limits, these properties can be improved.

That is, we have found that a copper powder of high oil absorption cannot be contained in conductive paints in a high content, and as a result the amount of copper powder on the surface of a coated film is small, giving rise to failure in soldering. We have found that this mainly stems from the shape of the copper particles and from the fact that, in the case of dendritic copper powder obtained by electrodeposition, the branches of the copper powder which have developed into the form of tree branches obstruct the dispersion into the resin with which they are mixed in the process step of producing a paint. We have found that in order to solve this problem, it is necessary that the dendritic copper powder be crushed by means of a grinding apparatus into green caterpillar-like or scalloped crystals. Thus we have attained the present invention.

SUMMARY OF THE INVENTION

The present invention, in one aspect thereof, relates to a copper powder for solderable and conductive paints which is in the form of green caterpillar-like crystals obtained by crushing particulate, dendritic electrolytic copper powder, and which has an oil absorption value (JIS K5101) of up to 20 ml/100 g; a maximum particle diameter of up to 44 μm; an average particle diameter of up to 10 μm; and a hydrogen-reduction loss of up to 0.5%.

In another aspect thereof, the present invention relates to a process for producing a copper powder for solderable and conductive paints, which comprises;
preparing a copper powder comprising particles of green caterpillar shape of an average particle diameter of up to 10 μm by crushing electrolytic copper powder of a maximum particle diameter of up to 44 μm by means of a crushing apparatus;
treating the copper powder thus obtained with a pickling solution comprising an inorganic acid or organic acid to dissolve and remove any oxidation film on the copper powder surface;
washing the copper powder with water;
spraying a quick-drying organic solvent on the copper powder; and
hot-air drying the copper powder, thereby obtaining a copper powder having an oil absorption value of up to 20 ml/100 g and a hydrogen-reduction loss of up to 0.5%.

BRIEF DESCRIPTION OF THE ILLUSTRATIONS

In the accompanying illustrations:
FIG. 1 is a photomicrograph showing green caterpillar-like crystals of copper powder according to the present invention.
FIG. 2 is a photomicrograph showing dendritic crystals of electrolytic copper powder which is the starting material of the above-mentioned green caterpillar-like crystal copper powder.

DETAILED DESCRIPTION OF THE INVENTION

Figure 2:

Starting copper powders used for conductive paints have hitherto been produced from electrolytic copper. Electrolytic copper is normally obtained by electrolyzing an electrolyte comprising an aqueous sulfuric acid solution of copper sulfate. A powder of electrolytic copper obtained by electrodeposition on the cathode has a shape which has developed into that resembling branches of wood, so-called dendritic form. FIG. 2 is a photomicrograph showing one example thereof. The starting copper powder used in the present invention has a maximum particle diameter of up to 44 μm. If copper powder exceeding this size limit is used, the average particle diameter will not become the objective less than 10 μm at the subsequent crushing treatment, and the conductive paint produced by this powder will roughen the surface of coated film, failing to form a uniform coated film.

Figure 1:

In the present invention the above described dendritic copper powder is crushed to form green caterpillar-like copper powder having an average particle diameter of less than 10 μm. In order to crush the powder to produce green caterpillar-like particles, the copper powder is pulverized by repeating the process several times with the use of various crushing apparatuses. For example, crushing is repeatedly performed, when the Atomizer, which is a trademark name, is used, more than 5 times, preferably more than 7 times. When the Jet Mill, which is a trademark name, is used, one time, resulting in collapsing of the branches of the dendritic copper powder to obtain a green caterpillar shape. FIG. 1 is a photomicrograph showing one example thereof. This is obtained by crushing the copper powder shown in FIG. 2. In the case of FIG. 2, it can be seen that spinelike projections attached to a trunk-like part at a certain angle are broken, the spinelike projections being mostly crushed into powder which as a whole is of green caterpillar shape.

The green caterpillar-like copper powder thus crushed is then treated by pickling with inorganic acids or organic acids to dissolve and remove the oxidized film that starting electrolytic copper powder per se has and the oxidized film which grows during the step of crushing. Examples of such pickling solutions preferably include one acid or mixtures of two or more acids selected from the group of $H_2SO_4$, HCl, $HNO_3$, $NH_4OH$, $CH_3COOH$ and $NH_4COOH$. The concentration is at least 0.1 mole.

The oxidized film which is formed on the surface of the copper powder by treating as described above with acids is dissolved and removed, and then the copper powder and pickling solutions are introduced into a centrifugal separator to be subjected to centrifugal separation for carrying out solid-liquid separation. Then, water is introduced into the centrifugal separator to wash the copper powder with water. After washing with water, a quick-drying organic solvent is sprayed onto the surface of the copper powder in the centrifugal separator to dry by passing therethrough a hot air stream at about 100° C. Examples of the above-mentioned quick-drying organic solvent are methanol, ethanol, acetone, and ether. The hot air drying treatment with the spraying of a quick drying organic solvent has the effect of restricting re-oxidation produced in the subsequent hot air drying step and further generates a very thin and stable oxidized film on the surface of the copper powder. Thus a synergistic effect such that the progress of the subsequent oxidation is restricted is produced. The copper powder thus obtained has a green caterpillar shape and has a maximum particle diameter up to 44 μm, an average particle diameter up to 10μ, a hydrogen-reduction loss up to 0.5%, preferably up to 0.2%, and a low oil absorption value of 20 ml/100 g or less, preferably 10 ml/100 g or less.

The hydrogen-reduction loss is measured according to JPMA P03-1992 method, as described below. When the hydrogen-reduction loss exceeds 0.5%, the surface of the coated film of the conductive paint starts to be slowly oxidized. A hydrogen-reduction loss of 0.2% or less produces a stable conductivity of the coated film. When the hydrogen-reduction loss exceeds 0.5%, the solderability of coated film product starts to deteriorate., and this tendency accelerates at 1.0% or more.

On the other hand, the oil absorption value is measured by a pigment testing method specified in Japanese Industrial Standard (JIS) K5101, as described below. In this case, the amount of linseed oil absorbed into pigments under specific conditions is measured to obtain the oil absorption value.

The measuring temperature is in the range of 15° to 25° C. as a standard and desirably in the range of 10° to 30° C. The oil absorption value is an important factor having an effect on the fundamental performance of conductive paints such as the conductivity and strength of the coated film and is affected by the shape of the copper powder particles themselves. Since the dendritic copper powder prepared by electrodeposition which have been conventionally used obstruct the dispersion thereof into a resin binder by reason of the development of branches which constitute the fundamental shape thereof, they have a poor oil absorption value due to heterogeneous mixing or coagulation, resulting in inferior conductivity, surface properties of the coated film, strength of the coated film, etc., in comparison with the crushed green caterpillar-like copper powder used in the present invention. However, the green caterpillar-like copper powder according to the present invention are such that the dendritic branches are completely broken by crushing and the surfaces of the copper powder particles facilitate dispersion when mixing with resins because of crushing of the inherent spinelike projections. As a result, it becomes possible to pack highly copper powder of low oil absorption value. Also, when the above described copper powder is used, the conductivity and the stability of the surface of coated film, of conductive paints are improved. Accordingly, the crushing operation according to the present invention is an important factor affecting this oil absorption value. The number of repetitions of crushing is also an important factor affecting the change from the dendritic form to the green caterpillar shape of the powder particles.

The methods for measuring the hydrogen reduction loss and the oil absorption will be now explained hereinbelow.

According to JPMA P03-1992 method, the hydrogen reduction loss of metal powder samples is measured as follows:

A reduction tube having a predetermined diameter and length is provided in a horizontal direction. The center part thereof is surrounded by a tubular reduction furnace. A reduction boat having a predetermined size and depth is weighed. Then, a sample is introduced into the boat until reaching a predetermined height and thus the total weight of the sample and the boat is weighed.

After once filling the inside of the tube with nitrogen, the reduction boat is introduced into the center part of the reduction tube which has been heated to a reduction temperature by the reduction furnace. Then, the supply of nitrogen is stopped and the sample is heated at a predetermined temperature for a predetermined time during allowing hydrogen to flow at a predetermined flow rate. In the case of copper, heating is carried out at a temperature of 875±15° C. for 30 minutes. Thereafter, the supply of hydrogen is stopped to take out the tube from the furnace during introducing nitrogen. After allowing the tube to stand for a while, the reduction tube is transported to a desiccator and thereafter the total weight is measured.

Reduction loss (HL: %) is calculated according to the following equation, $$HL = A - B/A - C \times 100$$

where A is an amount (g) of reduction boat+sample (before reduction); B is an amount (g) of reduction boat +sample (after reduction); and C is an amount (g) of reduction boat.

Further., according to JIS K5101-1991 the procedure for measuring the oil absorption is carried out as follows.

(a) 1 to 5 g of the sampled specimen is placed on the measurement glass plate at its center. From the burette, the boiled linseed oil (acid value 5.0–7.0) is gradually dropped, 4 or 5 drops at a time, onto the center of the specimen. Each time, the entire lot is thoroughly kneaded together with the spatula.

(b) Then, as the dropping and the kneading together are repeated until the entire material becomes a lump of the state of putty, the kneading together is carried out for each single drop. The instant at which, with a final single drop, the lump assumes a state wherein it can be wound into a spiral shape with the use of the spatula shall be taken as the end point (1). However, in the case where the lump cannot be wound into spiral shape, the instant immediately before the lump suddenly becomes soft with a single drop of the boiled linseed oil shall be taken as the end point.

(c) The procedures of (a) and (b) are so adjusted that the process time period up to the attainment of the end point will be 7 to 15 minutes.

(d) The quantity of the oil dropped from the boiled linseed oil within the burette at the instant the end point is reached is read.

(e) When a comparison with a sample product is to be carried out, the procedure of (a) to (d) is carried out with respect to also the sample product.

Note (1)

In the case where this procedure is to be carried out with respect to a specimen of unknown oil absorption, a preparatory test is carried out to verify beforehand the approximate value of the oil absorption.

The oil absorption is calculated by the following formula:

$$O = \frac{V}{m} \times 100$$

wherein
O: oil absorption (ml/100 g)
m: weight of the sample (g)
V: volume of the boiled linseed oil dropped (ml)

The room temperature at the measurement is recorded.

EXAMPLE 1

This example indicates hydrogen-reduction loss according to the production treatment process of the present invention.

| Process for removing oxidized coated-film | Hydrogen-reduction loss (%) |
| --- | --- |
| (1) 3.6M solution of $H_2SO_4$ | 0.15 |
| (2) 3.5M solution of $H_2SO_4$ + 0.1M solution of HCl | 0.15 |
| (3) 5M solution of $NH_4COOH$ | 0.13 |

Starting material used: Electrodeposited dendritic copper powder having a hydrogen-reduction loss of 0.25%

Crushed product: Product pulverized repeatedly 7 times by means of the Atomizer to an average particle diameter of 4.6 μm and a hydrogen-reduction, loss of 0.45%

Drying: By methanol spraying and air stream drying

Hydrogen-reduction loss measuring method: According to JPMA P03-1992 method at 875° C./30 minutes.

As indicated above, all samples showed excellent hydrogen-reduction loss values.

EXAMPLE 2

This example indicates change of the oil absorption value with the number of crushing repetitions.

| Crushing repetitions of Atomizer | 0 | 3 | 5 | 7 |
| --- | --- | --- | --- | --- |
| Particle shape | dendritic | dendritic + green caterpillar-like | green caterpillar-like | green caterpillar-like |
| Average particle diameter μm | 18.4 | 8.2 | 6.2 | 4.2 |
| Oil absorption value ml/100 g | 40.8 | 29.4 | 18.5 | 11.3 |

Crushing repetition zero: as shown in FIG. 2
Crushing repetition 7 times: as shown in FIG. 1
Measurement of particle diameter: Microtruck Treatment and drying: Pickling with 3.6M solution of $H_2SO_4$ and after washing with water, ethanol spraying and drying with hot air.

Oil absorption value measurement: JIS K5101 method, by the use of linseed oil at 20° C.

From the above results, it was apparent that copper powder not subjected to crushing had a large oil absorption value. When the repetition of crushing by means of the Atomizer exceeds 5 times, the powder is crushed from the dendritic form of electrodeposition to have branches of green caterpillar-like form. On the other hand, although materials crushed 5 repeated times had no branches, they were in a state wherein spinelike projections, which were similar to those possessed by dendritic starting copper powder, remained in slight amounts on the green caterpillar-like surface. When the repetition of crushing was more than 7 times, spinelike projections were completely crushed as judged from FIG. 1.

EXAMPLE 3

This example shows hydrogen reduction losses and conductivity measurement values.

| Hydrogen reduction-loss (%): | 0.15 | 0.41 | 0.68 |
| --- | --- | --- | --- |
| Specific resistivity of coated film ($\times 10^{-5}$ Ω · cm) | 5 | 8 | 12 |

Copper powder used: Green caterpillar-like copper powder which was crushed 7 repeated times and had an average particle diameter of 5.8 μm.
Resin used: Resol type phenolic resin
Copper content in coated film product: 90% (based on resin binder solid product)
Solvent: Methyl carbitol
Substrate: Glass epoxy resin 10 cm square
Method of forming coated film: Screen printing. Thickness of 25 to 30 μm
Condition of curing of coated film: 160° C. for 30 minutes in recycling oven
As is shown above, it was clear that copper powder having a small hydrogen reduction-loss exhibited excellent conductivity.

EXAMPLE 4

This example shows measurement values relating to the relationship between solder wettability and hydrogen-reduction loss.

| Hydrogen-reduction loss (%) | Oil absorption value (ml/100 g) | | | | |
| --- | --- | --- | --- | --- | --- |
|  | 11.3 | 18.5 | 29.4 | 40.8 | 54.6 |
| 0.2 | o | o | Δ | Δ | x |
| 0.3 | o | o | Δ | Δ | x |
| 0.5 | o | o | Δ | Δ | x |
| 0.6 | x | x | x | x | x |

Solder wettability
603 : In the case where all of 10 pieces of 5 mm square pad were wetted
Solder wettability
Δ: In the case where one or more of 10 pieces of 5 mm square pad was (were) not wetted
Solder wettability
x: In the case where all of 10 pieces of 5 mm square pad were not wetted
Solder dipping condition: 230° C./3 seconds
Solder composition: Pb60%/Sn40%
Other conditions: Same as the conditions of Example 3

From the above result, it became clear that copper powder having a small oil absorption value and a small hydrogen-reduction loss exhibited improved solder wettability. Further, it became clear that when hydrogen-reduction loss exceeded 0.5%, solder wettability became poor.

EXAMPLE 5

This example shows measurement values relating to solder wettability and copper content in coated film composition.

| Copper content in coated film composition (%) | Oil absorption value (ml/100 g) | | | | |
| --- | --- | --- | --- | --- | --- |
|  | 11.3 | 18.5 | 29.4 | 40.8 | 54.6 |
| 80 | x | x | x | x | x |
| 85 | x | x | x | x | x |
| 88 | o | o | x | — | — |
| 90 | o | o | x | — | — |
| 93 | o | o | — | — | — | o: In the case where all of 10 pieces of 5 mm square pad were wetted
Solder wettability
Δ: In the case where one or more of 10 pieces of 5 mm square pad was (were) not wetted
Solder wettability
X: In the case where all of 10 pieces of 5 mm square pad were not wetted
Solder wettability
—: Coated film could not be formed
Solder dipping condition: 230° C./3 seconds
Solder composition: Pb60%/Sn40%
Other conditions: Same as the conditions of Example 3

From the above result, it became clear that copper powder having a small oil absorption value could increase the copper content in coated film, and as a result, solder wettability was increased.

EXAMPLE 6

This example shows measurement values relating to solder wettability and adhesion strength of coated film.

| hydrogen reduction loss (%) | Oil absorption value (ml/100 g) | | | | |
| --- | --- | --- | --- | --- | --- |
|  | 11.3 | 18.5 | 29.4 | 40.8 | 54.6 |
| 0.1 | 2.24 | 1.85 | 0.67 | 0.55 | — |
| 0.2 | 1.97 | 1.52 | 0.34 | 0.26 | — |
| 0.2 | 1.47 | 1.15 | 0.21 | 0.08 | — |
| 0.5 | 1.09 | 1.01 | — | — | — |
| 0.6 | — | — | — | — | — |

Unit: Kg/mm²
—: Unsuccessful soldering of 1 mmφSn plated copper wire
Other measuring conditions: Same as Example 3
From the result of Example 6, it became clear that copper powder having a small oil absorption value and small hydrogen-reduction loss increased soldering strength.

As a result of summarizing the above examples, it was clear that green caterpillar-like copper powder which had been crushed 5 times or more, preferably 7 times or more by means of the Atomizer, and which had an oil absorption value up to 20 ml/100 g, an average particle diameter up to 10 μm and a hydrogen reduction-loss up to 0.5%, preferably up to 0.2%, exhibited excellent conductivity and solderability.

By the use of copper powder comprising particles of green caterpillar shape and having small oil absorption value as well as small hydrogen reduction-loss as a filler for conductive paints, it becomes possible to increase and make uniform the amount of copper powder contained in the surface of coated film of conductive paints. Further direct dipping in the solder becomes possible, whereby process shortening by the formation of circuits by the all additive method becomes possible.

What is claimed is:
1. A copper powder for solderable and electroconductive paints, comprising particles of green caterpillar shape obtained by crushing dendritic electrolytic copper powder, and having an oil absorption value (JIS K5101) of up to 20 ml/100 g; a maximum particle diameter of up to 44 μm; an average particle diameter of up to 10 μm; and a hydrogen-reduction loss of up to 0.5%.
2. The copper powder of claim 1 wherein the hydrogen-reduction loss is up to 0.2%.

* * * * *